United States Patent
Trim et al.

(10) Patent No.: US 11,501,179 B2
(45) Date of Patent: Nov. 15, 2022

(54) COGNITIVE ROBOTICS SYSTEM THAT REQUESTS ADDITIONAL LEARNING CONTENT TO COMPLETE LEARNING PROCESS

(71) Applicant: INTERNATIONAL BUSINESS MACHINES CORPORATION, Armonk, NY (US)

(72) Inventors: Craig M. Trim, Ventura, CA (US); Victor Povar, Vancouver (CA); Sarbajit K. Rakshit, Kolkata (IN); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1023 days.

(21) Appl. No.: 16/202,740

(22) Filed: Nov. 28, 2018

(65) Prior Publication Data

US 2020/0167688 A1 May 28, 2020

(51) Int. Cl.
*G06F 15/16* (2006.01)
*G06N 5/02* (2006.01)
*B25J 13/00* (2006.01)
*B25J 9/16* (2006.01)
*G06N 5/04* (2006.01)
*G06N 20/00* (2019.01)

(52) U.S. Cl.
CPC ............. *G06N 5/022* (2013.01); *B25J 9/163* (2013.01); *B25J 13/003* (2013.01); *G06N 5/04* (2013.01); *G06N 20/00* (2019.01)

(58) Field of Classification Search
CPC .......... G06N 5/022; G06N 5/04; G06N 20/00; B25J 9/163; B25J 13/003

USPC ........................................................ 709/200
See application file for complete search history.

(56) References Cited

U.S. PATENT DOCUMENTS 8,307,099 B1 * 11/2012 Khanna ............... H04L 63/1416
709/225
8,326,780 B2 12/2012 Gupta et al.
(Continued)

FOREIGN PATENT DOCUMENTS

WO 2017201023 A1 11/2017

OTHER PUBLICATIONS

Tenorth et al., "Knowledge Processing for Cognitive Robots", Künstliche Intelligenz, vol. 24, 2010, 6 pages.
(Continued)

*Primary Examiner* — Moustafa M Meky
(74) *Attorney, Agent, or Firm* — Randy Emilio Tejeda; Andrew D Wright; Calderon Safran & Cole, P.C.

(57) ABSTRACT

A computer-implemented method includes establishing, by a computer device, an activity to be performed by a robot; determining, by the computer device, a required knowledge that is required for the robot to perform the activity; comparing, by the computer device, the required knowledge to a current knowledge of the robot to establish an additional learning that is needed for the robot to perform the activity; requesting, by the computer device, the additional learning; directing, by the computer device, retrieval of the additional learning to the robot if the additional learning is available for retrieval; and requesting, by the computer device, that the additional learning be created if the additional learning is not available for retrieval.

20 Claims, 7 Drawing Sheets

(56) References Cited

U.S. PATENT DOCUMENTS

| | | | |
|---|---|---|---|
| 8,682,485 B2 | 3/2014 | Anhalt et al. | |
| 8,763,116 B1* | 6/2014 | Khanna | G06F 21/552 |
| | | | 709/225 |
| 9,259,842 B2* | 2/2016 | Fouillade | B25J 13/003 |
| 9,440,352 B2 | 9/2016 | Meier et al. | |
| 9,497,216 B2* | 11/2016 | Khanna | G06F 21/552 |
| 9,805,306 B1 | 10/2017 | Bataller et al. | |
| 9,950,431 B2* | 4/2018 | Fouillade | B25J 13/003 |
| 10,335,954 B2* | 7/2019 | Monceaux | B25J 11/0005 |
| 10,751,879 B2* | 8/2020 | Li | G06N 20/00 |
| 10,963,493 B1* | 3/2021 | Hu | G06N 5/041 |
| 11,151,992 B2* | 10/2021 | Cui | G06V 40/161 |
| 11,273,553 B2* | 3/2022 | Li | G06N 3/0445 |
| 2012/0316676 A1* | 12/2012 | Fouillade | B25J 9/1697 |
| | | | 901/1 |
| 2014/0250526 A1* | 9/2014 | Khanna | G06F 21/60 |
| | | | 726/22 |
| 2015/0290800 A1 | 10/2015 | Avigad et al. | |
| 2016/0136817 A1* | 5/2016 | Fouillade | B25J 9/1697 |
| | | | 901/1 |
| 2017/0113353 A1* | 4/2017 | Monceaux | G10L 13/027 |
| 2018/0349527 A1* | 12/2018 | Li | B25J 9/161 |
| 2019/0206400 A1* | 7/2019 | Cui | G05D 1/0016 |
| 2020/0353621 A1* | 11/2020 | Li | G06N 20/00 |
| 2022/0193912 A1* | 6/2022 | Li | B25J 9/163 |

OTHER PUBLICATIONS

Mell et al., "The NIST Definition of Cloud Computing", NIST, Special Publication 800-145, Sep. 2011, 7 pages.

\* cited by examiner

COGNITIVE ROBOTICS SYSTEM THAT REQUESTS ADDITIONAL LEARNING CONTENT TO COMPLETE LEARNING PROCESS

BACKGROUND

The present invention relates generally to robotic learning and, more particularly, to a cognitive robot that determines what, if any, learning is needed to perform a particular activity and acquires the needed learning.

Many homes and businesses include robots of one form or another. Robots can be, for example, a moving mechanical robot or a stationary electronic robot. For example, many homes now include an intelligent personal, or cognitive, assistant that is voice activated and is connected to the internet and various appliances and other devices in the home. Robots perform many functions such as, for example: controlling lights, HVAC systems, appliances, audio/visual systems; accessing the internet to answer questions and find services; and performing teaching/learning functions.

SUMMARY

In a first aspect of the invention, there is a computer-implemented method including establishing, by a computer device, an activity to be performed by a robot; determining, by the computer device, a required knowledge that is required for the robot to perform the activity; comparing, by the computer device, the required knowledge to a current knowledge of the robot to establish an additional learning that is needed for the robot to perform the activity; requesting, by the computer device, the additional learning; directing, by the computer device, retrieval of the additional learning to the robot if the additional learning is available for retrieval; and requesting, by the computer device, that the additional learning be created if the additional learning is not available for retrieval.

In another aspect of the invention, there is a computer program product including a computer readable storage medium having program instructions embodied therewith. The program instructions are executable by a computing device to cause the computing device to: receive verbal input from a user; establish an activity to be performed by a robot, the verbal input being used to establish the activity to be performed by the robot; determine a required knowledge that is required for the robot to perform the activity; compare the required knowledge to a current knowledge of the robot to establish an additional learning that is needed for the robot to perform the activity; request the additional learning; and direct retrieval of the additional learning to the robot if the additional learning is available for retrieval.

In another aspect of the invention, there is system including a processor, a computer readable memory, and a computer readable storage medium. The system includes program instructions receive verbal input from a user; program instructions to establish an activity to be performed by a robot, the verbal input being used to establish the activity to be performed by the robot; program instructions to determine a required knowledge that is required for the robot to perform the activity; program instructions to compare the required knowledge to a current knowledge of the robot to establish an additional learning that is needed for the robot to perform the activity; program instructions to request the additional learning; and program instructions to direct retrieval of the additional learning to the robot if the additional learning is available for retrieval. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to robotic learning and, more particularly, to a cognitive robot that determines what, if any, learning is needed to perform a particular activity and acquires the needed learning. According to aspects of the invention a computer device determines if a robot possesses the required learning to perform an activity requested by a user. If the computer device determines that the robot does not possess the required learning, the computer device searches for the needed additional learning required by the robot to perform the activity. If the additional learning is available, the computer device provides the additional learning to the robot. In embodiments, if the additional learning is not available, the computer device requests that the additional learning be produced. In this manner, implementations of the invention improve the performance and functionality of robots.

Implementations of the invention improve the performance of a voice-sensing robot by determining a knowledge that is required for the robot to perform an activity, comparing the required knowledge to a current knowledge of the robot to establish an additional learning that is needed for the robot to perform the activity, requesting the additional learning, directing retrieval of the additional learning if the additional learning is available for retrieval, and requesting that the additional learning be created if the additional learning is not available for retrieval. Embodiments of the invention determine a partial activity that is performable by the robot without the additional learning.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
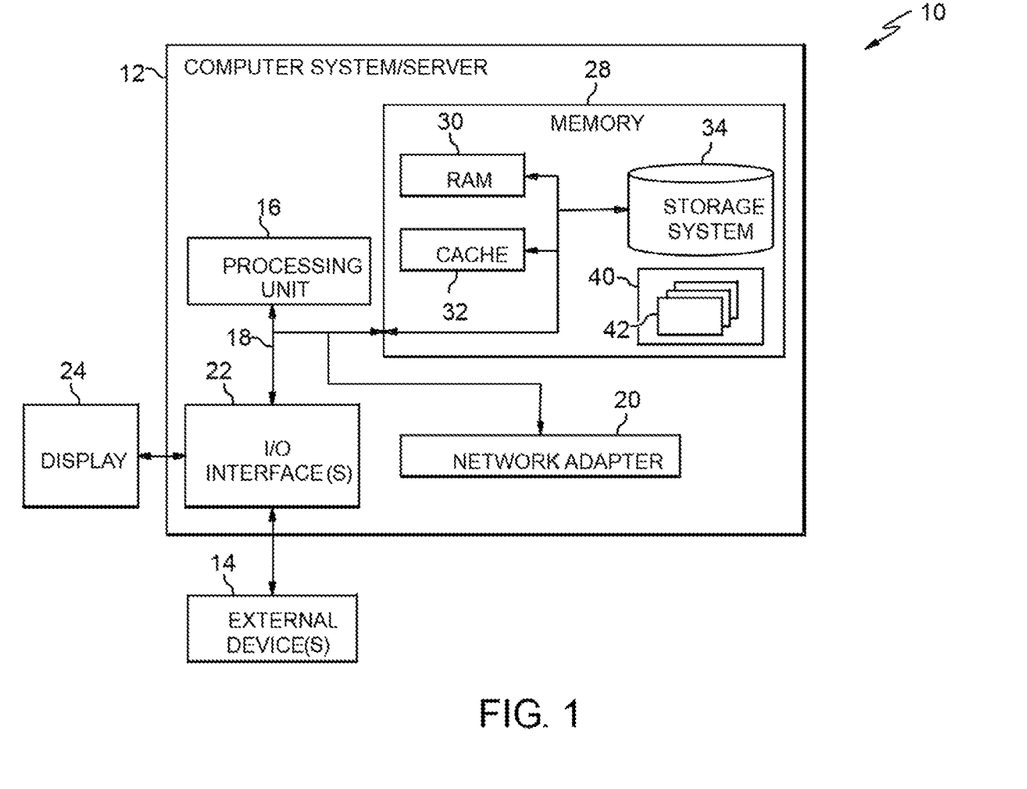
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
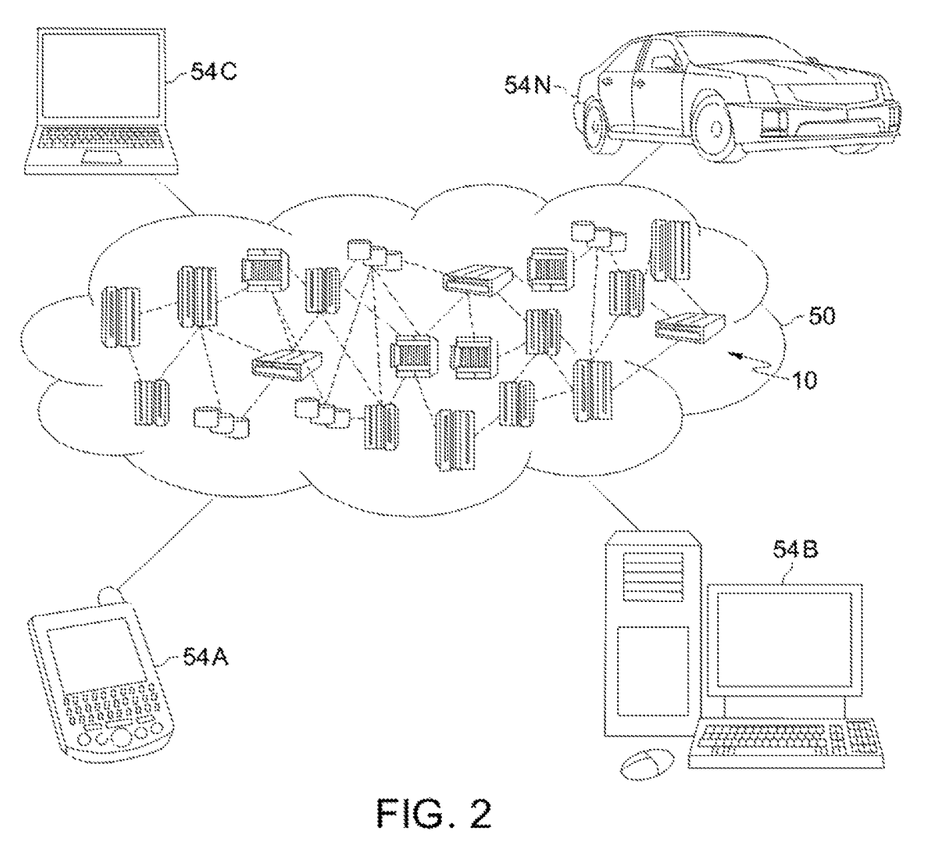
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
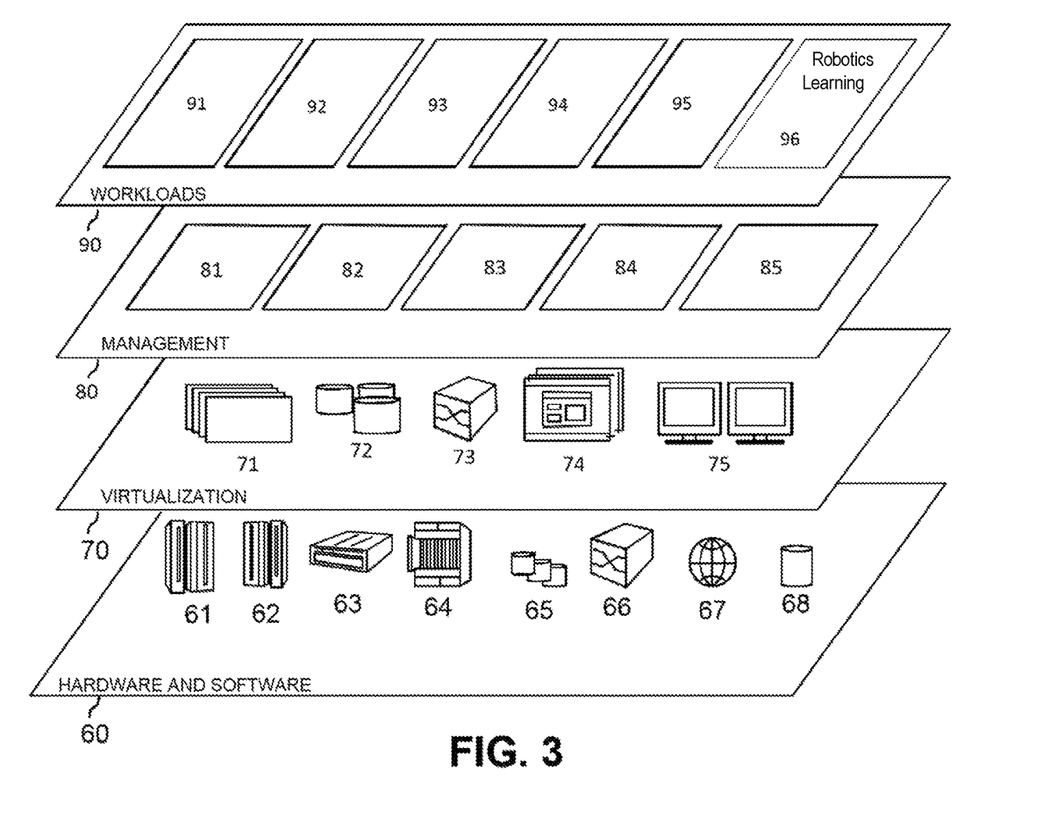
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and robotics learning 96.

Implementations of the invention may include a computer system/server 12 of FIG. 1 in which one or more of the program modules 42 are configured to perform (or cause the computer system/server 12 to perform) one of more functions of the robotics learning 96 of FIG. 3. For example, the one or more of the program modules 42 may be configured to: establish an activity to be performed by a robot; determine a required knowledge that is required for the robot to perform the activity; compare the required knowledge to a current knowledge of the robot to establish an additional learning that is needed for the robot to perform the activity; request the additional learning; direct retrieval of the additional learning to the robot if the additional learning is available for retrieval; and request that the additional learning be created if the additional learning is not available for retrieval.

A cognitive robot that tries to execute an activity or answer a question when the robot possesses partial or incomplete learning can produce a result that is simply not useful or a result that produces negative effects. This can especially be true if a user of the robot is not aware that the robot does not possess the required knowledge to properly perform the activity or answer the question. For simplicity, the term "activity" is used in this disclosure to mean physical activities, electronic activities, question answering, and any other activity or function performable by a robot. Embodiments of the invention include methods and systems by which a cognitive robot will automatically alert the user if the system identifies the learning required for a particular activity is partial or incomplete.

Embodiments of the invention include methods and systems by which: in the learning process, a cognitive robot analyzes an activity (or a predicted activity) and the robot's own knowledge to determine if the learning process is complete in order for the robot to execute the activity; based on the current learned content (knowledge) of the robot, the robot predicts which, if any, learning content required to perform the activity is missing; a user of the robot is informed if the robot identifies that the learning process is incomplete, and the robot asks the system/administrator for additional content that is needed to complete the activity; and based on the current learned content, the robot identifies what activity cannot be completed without getting additional learning and the robot does not execute the activity unless the robot receives confirmation from the user that the partial activity should be performed.

Embodiments of the invention include the following steps: a cognitive robot profiles historical learning and categorizes the historical learning based on an activity that can be performed with that learned content (for example, a robot based movement such as car washing, floor cleaning, or giving a suggestion to execute an activity like giving medicine); the robot performs a search in the public domain to get additional information about the already leaned content to get additional detail information; based on contextual analysis of the learned data, software identifies associated question words for each topic the robot learns, which become part of the metadata of the learned content; the identified question metadata for each topic is stored as a category of that topic (for example, the available questions that relate to a lifting activity of the robot); when any new content is learned, the robot determines what type of content is newly learned and categorizes that content; when any new content is learned, the robot analyzes the newly learned content against various questions (for example, what has to be done?, what is a backup option if the learning fails?, whom to inform?, how long does the activity take to complete?); if the robot identifies the various questions as answered, then the robot considers the learning as completed with some degree of satisfaction; if answers to some of the various questions are not available, the robot considers the learning topic as not completed and notifies the system/administrator and asks the system/administrator to provide additional information; during any learning process, if the robot identifies any new question, then the new question is asked against the already learned content and the system/administrator is notified of any gap in the learning; based on the availability of answers to the various questions, the robot (1) identifies the current capability to perform the activity and notifies the user as to what activity cannot be performed, and (2) sends a notification to the system/administrator to gather/produce answers to any of the various questions for which answers are not available.

Figure 4:
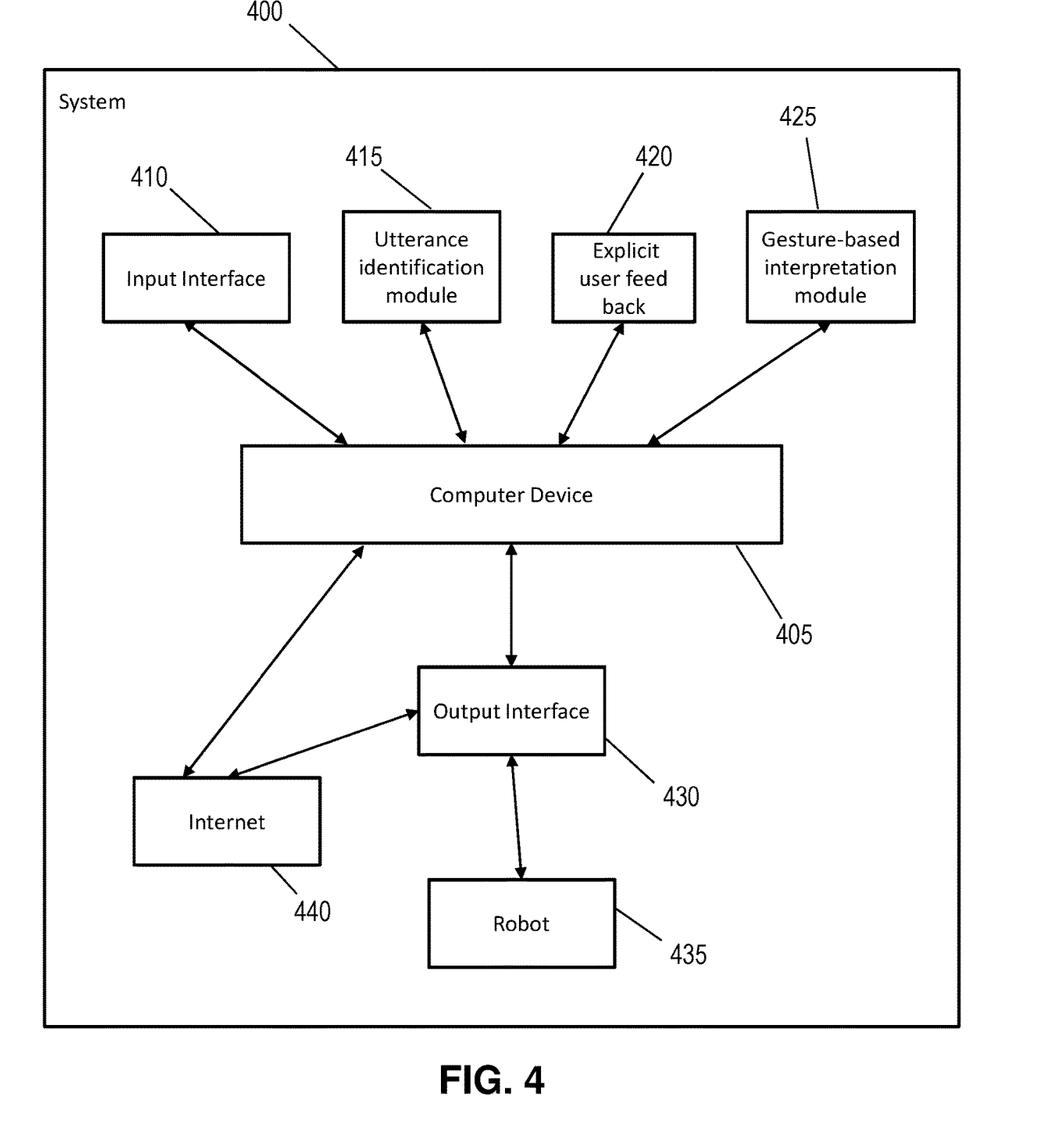
FIG. 4 shows a block diagram of an exemplary environment in accordance with aspects of the invention.

FIG. 4 shows a block diagram of an exemplary environment in accordance with aspects of the invention. In embodiments, the environment includes a system 400 including a computer device 405, such as for example computer system/server 12, that receives input such as a question or instruction from a user through an input interface 410. In embodiments, the computer device 405 is a smart speaker or virtual assistant. In other embodiments, the computer device 405 is a server or other computer in an industrial setting using robots or located remotely from the robots. In embodiments, the input interface 410 is connected to a plurality of input devices such as, for example, cameras and microphones. The input received from the user through input interface 410 can be verbal input such as voice input. In this embodiment, various modules (one or more program modules 42 of FIG. 1) assist the computer device 405 in interpreting the verbal input and converting it to text which is used by the computer device in further processing explained in detail below. In embodiments, the various modules are a part of computer device 405. In other embodiments, the various modules are outside of computer device 405 and are accessed by computer device 405 when needed.

In this example, an utterance identification module 415 (one or more program modules 42 of FIG. 1) interprets the verbal input to determine if the user has finished the verbal input by identifying repeated words and phrases. If the utterance identification module 415 identifies a repeated series of words or phrases, it sends an instruction to the computer device 405 that the utterance identification module 415 believes that the user has completed the question or instruction and has begun repeating the question or instruction. In this example, explicit user feedback 420 is received by the computer device 405 from the user. In embodiments, the explicit user feedback 420 includes a response (either verbal, text, or other form) from the user to a question or other inquiry from the computer device 405 to the user.

In embodiments, a gesture-based interpretation module 425 (one or more program modules 42 of FIG. 1) interprets motions of the user and/or facial, hand, or other expressions of the user to determine if the user has completed the question or instruction. In embodiments, the gesture-based interpretation module 425 receives visual data from one or more cameras located within line of sight of the user. For example, in embodiments, a robot 435 (described below) includes one or more cameras that capture images (still images and/or video images) used by the gesture-based interpretation module 425. In embodiments, the gesture-based interpretation module 425 uses image analysis to interpret the gestures of the user. For example, the user moving away from the input devices connected to the user interface 410 is, in some embodiments, in indication that the user has completed the question or instruction. In embodiments, the gesture-based interpretation module 425 interprets facial, hand, or other gestures of the user to produce additional data that the computer device 405 uses to interpret the question or instruction of the user.

In this example, an output interface 430 provides a connection between the computer device 405 and any devices that use the output of the computer device such as, for example, a robot 435 and an internet connection that accesses the internet 440 for information (explained in detail below). In embodiments, the computer device 405 is a part of the robot 435. In other embodiments, the computer device 405 is separate from the robot 435 and is located remotely from the robot 435. For example, in embodiments, the computer device is a cloud-based server such as the cloud computing node 10 of FIG. 2.

Figure 5:
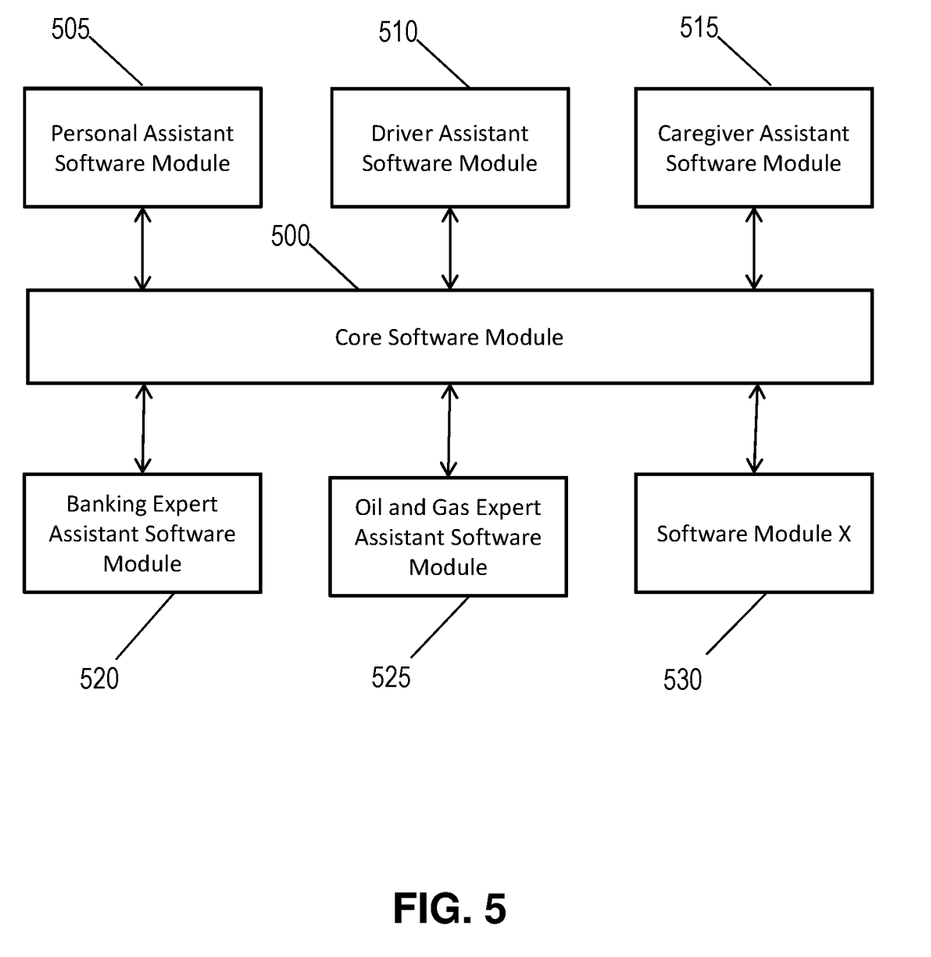
FIG. 5 shows a block diagram of an exemplary environment in accordance with aspects of the invention.

FIG. 5 shows a block diagram of an exemplary environment in accordance with aspects of the invention. In embodiments, the environment includes a core software module 500 (for example, program module) that includes software that provides a basic, or core, functionality. In this example, the core software module 500 and all of the other software modules shown in FIG. 5 are parts of the computer device 405. In embodiments, the core software module 500 and all of the other software modules shown in FIG. 5 are separate from computer device 405 but are accessed by computer device 405 for the knowledge in software module 500 and all of the other software modules shown in FIG. 5. Software module 500 and all of the other software modules shown in FIG. 5 are one or more of program modules 42 of FIG. 1. For example, in embodiments, a basic functionality includes voice recognition, other user interfaces, voice to text conversion, and a general knowledge of common topics which a user may query. The example shown in FIG. 5 also includes a number of additional software modules that are additions to the core software module 500.

In this example, a personal assistant software module 505 provides added functionality regarding knowledge of topics and activities associated with assisting a user in daily personal and business management matters. In another example, the personal assistant software module 505 provides operating instructions to the robot for the robot to physically provide personal of business management assistance to a user.

In embodiments, a driver assistant software module 510 provides added functionality regarding knowledge of topics and activities associated with driving a vehicle. For example, the driver assistant software module 510 provides detailed information about a specific vehicle the user operates. In another example, the driver assistant software module 510 provides detailed information about operating a motor vehicle and driving laws for use by a person learning how to operate a motor vehicle. In another example, the driver assistant software module 510 provides operating instructions to the robot for the robot to physically operate a vehicle for a user.

In embodiments, a caregiver assistant software module 515 provides added functionality regarding knowledge of topics and activities important to caregivers. For example, the caregiver assistant software module 515 provides detailed information regarding providing care for medical conditions of a user. In another example, the caregiver assistant software module 515 provides operating instructions to the robot for the robot to physically provide care to a user that requires assistance.

In embodiments, a banking expert assistant software module 520 provides added functionality regarding knowledge of topics and activities associated with banking. For example, the banking expert assistant software module 520 provides detailed information regarding banking rules and procedures and best practices for optimizing the use of banks and financial institutions. In another example, the banking expert assistant software module 520 provides operating instructions to the robot for the robot to conduct banking matters such as, for example, moving money between accounts, paying bills, and analyzing investment accounts for a user.

In embodiments, an oil and gas expert assistant module 525 provides added functionality regarding knowledge of topics and activities associated with the oil and gas industry. For example, the oil and gas expert assistant software module 525 provides detailed information regarding oil and gas industry rules and procedures and best practices for optimizing transactions within the oil and gas industry. In another example, the oil and gas expert assistant software module 525 provides operating instructions to the robot for the robot to conduct control functions and/or physical maneuvers in the operation and/or maintenance of an oil or gas facility.

In embodiments, one or more of various software modules 530 are purchased or otherwise acquired by the user to expand on the knowledge of the robot beyond the knowledge provided in core software module 500. In embodiments, the additional learning referred to in this disclosure is provided by the user purchasing, leasing, or otherwise acquiring one or more software modules 530 that include the additional learning.

Figure 6:
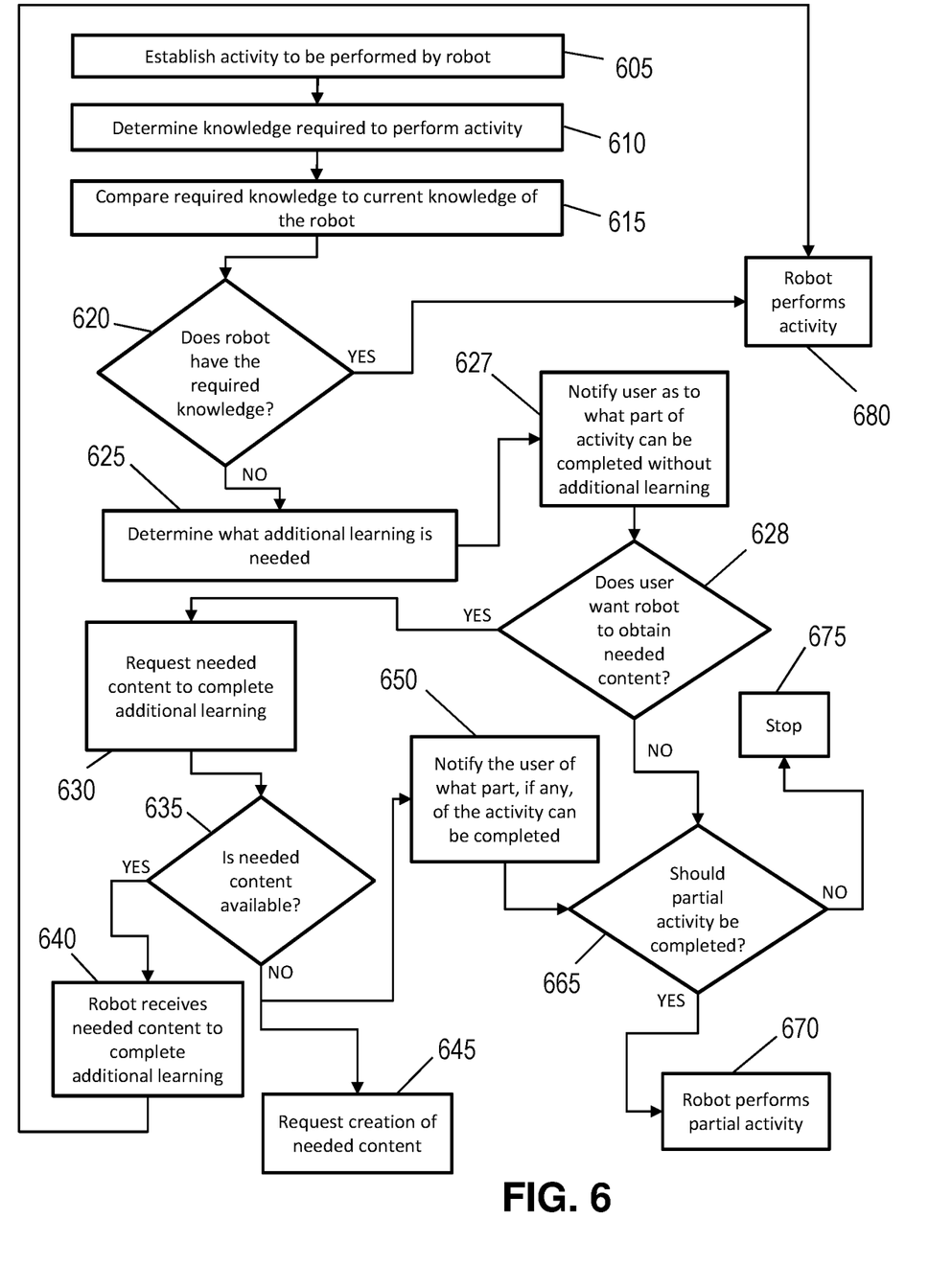
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, a system 400 establishes an activity to be performed by a robot, for example the robot 435. In embodiments, the activity is established by the computer device 405 receiving input from a user through the input interface 410 and interpreting that input with the help of the utterance identification module 415 and the gesture-based interpretation module 425. At step 610, the computer device 405 determines the knowledge required to perform the activity. At step 615, the computer device 405 compares the knowledge required to perform the activity with the current knowledge of the robot 435. At step 620, if the robot 435 possesses the knowledge required to perform the activity, processing continues to step 680 where the robot 435 performs the activity.

If, at step 620, the robot 435 does not possess the knowledge required to perform the activity, processing continues to step 625. At step 625, the computer device 405 determines what additional learning is required for the robot 435 to perform the activity. At step 627, the computer device 405 notifies the user of the robot as to what part of the activity can be completed without the additional learning. At step 628, if the user wants the robot 435 to obtain the needed content to perform the additional learning, then processing continues to step 630, where the computer device requests from, for example, an outside source over the internet, the needed content to complete the additional learning. In embodiments, a source of the needed content is a database or depository of content that is internal to an organization that operates the computer device 405 and/or the robot 435.

At step 635 the computer device 405 determines if the needed content is available from, for example, an enterprise depository or the Internet. If the needed content is available, processing continues to step 640 where the robot 435 receives the needed content from, for example, the enterprise depository or the Internet either directly or through the computer device 405, and the additional learning is completed. Processing then continues to step 680 where the robot 435 performs the activity.

If, at step 635, the computer device 405 determines that the needed content is not available, processing continues to steps 645 and 650. At step 645, the computer device 405 requests that the needed content be created for future use. For example, the computer device 405 requests that an external or internal supplier assembles the knowledge and content needed for the robot 435 to perform the activity. At step 650, the computer device 405 notifies the user of what part, if any, of the activity can be completed with the current knowledge of the robot 435.

At step 665, the user determines if the partial activity should be completed. If, at step 665, the user determines that the partial activity should be completed, processing continues to step 670 where the robot 435 performs the partial activity. If, at step 665, the user determines hat the partial activity should not be performed, processing continues to step 675 where processing stops.

While this example shown in FIG. 6 is described with the computer device 405 being external to the robot 435, it is noted that in other examples, the computer device 405 is internal to the robot 435.

Figure 7:
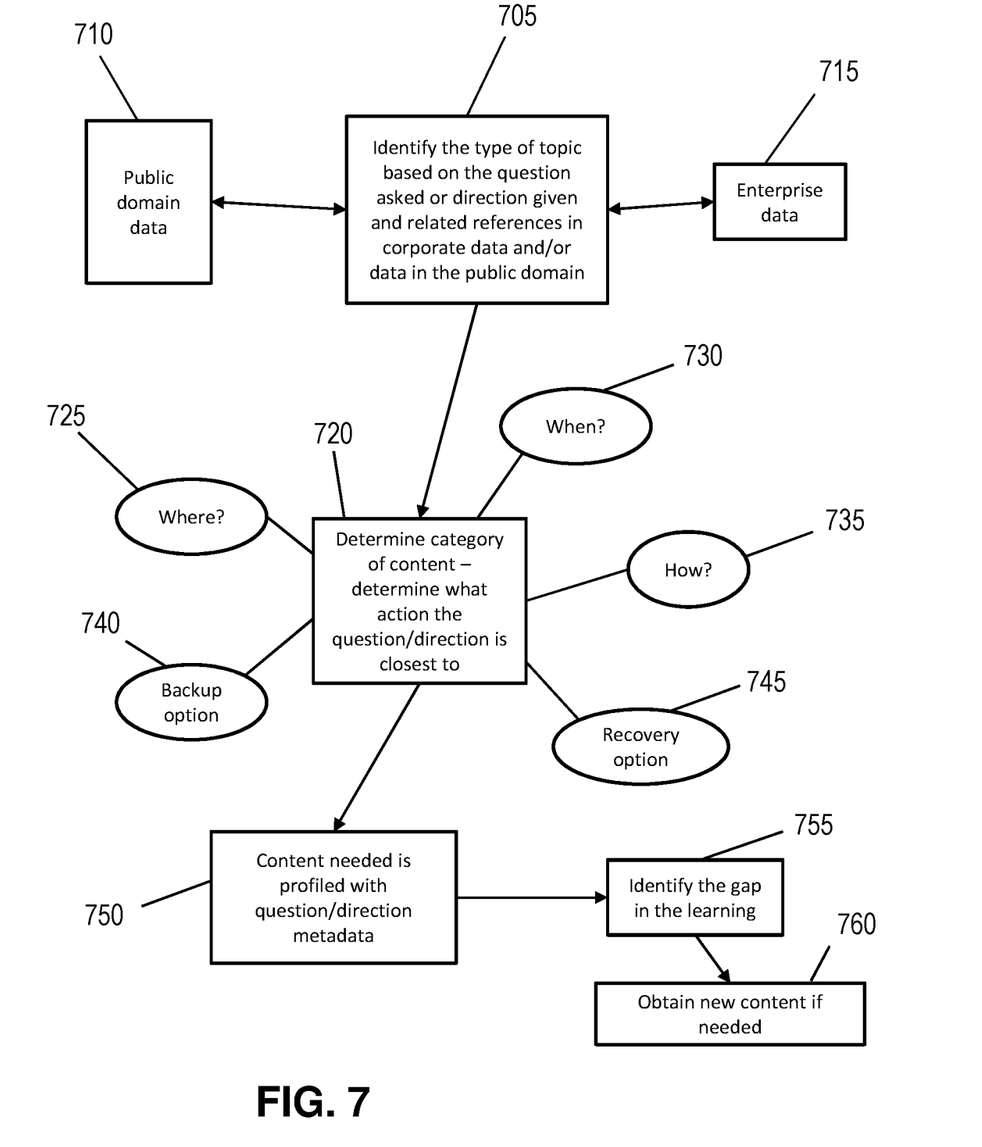
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4. The method shown in FIG. 7 illustrates an example of a process by which the computer device 405 determines the category of the content needed by determining what action the question asked or direction given is closest to. The method of FIG. 7 is one example of the determining of step 610 in FIG. 6.

At step 705, the computer device 405 identifies a type of topic based on the question asked or direction given and references in enterprise data 715 and/or data in the public domain 710 that are related to the question/direction. The references in enterprise data 715 and/or data in the public domain 710 are used to better understand what the user wants by identifying the type of topic (such as "drive me to a destination" or "find the answer to my question") by putting the question/direction in the context of how it is used in other instances.

At step 720, the computer device 405 determines a category of the content to determine what action the question/direction is closest to. In this example, such categories include questions such as where 725, when 730, and how 735 a user wants the activity performed. Other categories include a backup option 740 to an activity and a recovery option 745 to an activity. The question/direction specific information regarding the categories 725, 730, 735, 740, 745 becomes metadata that is added to any existing metadata of the particular topic to which the question/direction belongs.

At step 750, the question metadata is use to profile/determine the content that is needed for the robot 435 to answer the question or comply with the direction. At step 755, the computer device 405 identifies a gap, if any, between the current knowledge of the robot 435 and the content needed to answer the question or comply with the direction. At step 760, the computer device 405 obtains the new content if a gap exists and new learning is required.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    establishing, by a computer device, an activity to be performed by a robot;
    determining, by the computer device, a required knowledge that is required for the robot to perform the activity;
    comparing, by the computer device, the required knowledge to a current knowledge of the robot to establish an additional learning that is needed for the robot to perform the activity;
    requesting, by the computer device, the additional learning;
    directing, by the computer device, retrieval of the additional learning to the robot if the additional learning is available for retrieval; and
    requesting, by the computer device, that the additional learning be created if the additional learning is not available for retrieval.

2. The computer-implemented method of claim 1, further comprising requesting, by the computer device, permission from a user of the robot to retrieve the additional learning before retrieving the additional learning.

3. The computer-implemented method of claim 1, further comprising determining, by the computer device, a partial activity that is performable by the robot without the additional learning.

4. The computer-implemented method of claim 3, further comprising requesting, by the computer device, permission from a user of the robot to perform the partial activity.

5. The computer-implemented method of claim 1, wherein the computer device is part of the robot.

6. The computer-implemented method of claim 1, wherein the computer device is located remotely from the robot.

7. The computer-implemented method of claim 1, further comprising receiving, by the computer device, verbal input from a user, wherein the verbal input is used in the establishing the activity to be performed by the robot.

8. The computer-implemented method of claim 7, wherein the verbal input is a question and the activity to be performed by the robot includes providing an answer to the question.

9. The computer-implemented method of claim 7, wherein the verbal input is a direction to perform the activity.

10. The computer-implemented method of claim 7, wherein the computer device accesses remote data and uses the remote data in the establishing the activity to be performed by the robot.

11. The computer-implemented method of claim 1, wherein the computer device includes software provided as a service in a cloud environment.

12. A computer program product, the computer program product comprising a computer readable storage medium having program instructions embodied therewith, the program instructions executable by a computing device to cause the computing device to:
receive verbal input from a user;
establish an activity to be performed by a robot, the verbal input being used to establish the activity to be performed by the robot;
determine a required knowledge that is required for the robot to perform the activity;
compare the required knowledge to a current knowledge of the robot to establish an additional learning that is needed for the robot to perform the activity;
request the additional learning; and
direct retrieval of the additional learning to the robot if the additional learning is available for retrieval.

13. The computer program product of claim 12, further comprising program instructions executable by the computing device to cause the computing device to request that the additional learning be created if the additional learning is not available for retrieval.

14. The computer program product of claim 13, wherein the retrieval is by downloading from a source located remotely from the robot.

15. The computer program product of claim 12, further comprising program instructions executable by the computing device to cause the computing device to inform the user in response to the verbal input that the robot does not possess the required knowledge.

16. The computer program product of claim 12, further comprising program instructions executable by the computing device to cause the computing device to inform the user of a cost of retrieving the additional learning.

17. A system comprising:
a processor, a computer readable memory, and a computer readable storage medium;
program instructions to receive verbal input from a user;
program instructions to establish an activity to be performed by a robot, the verbal input being used to establish the activity to be performed by the robot;
program instructions to determine a required knowledge that is required for the robot to perform the activity;
program instructions to compare the required knowledge to a current knowledge of the robot to establish an additional learning that is needed for the robot to perform the activity;
program instructions to request the additional learning; and
program instructions to direct retrieval of the additional learning to the robot if the additional learning is available for retrieval,
wherein the program instructions are stored on the computer readable storage medium for execution by the processor via the computer readable memory.

18. The system of claim 17, further comprising program instructions to interpret the verbal input based on a tone of the verbal input.

19. The system of claim 17, further comprising program instructions to interpret the verbal input based on a repetition of words in the verbal input.

20. The system of claim 19, further comprising program instructions to determine that the verbal input is complete based on the repetition of words.

* * * * *